Patented Jan. 3, 1950

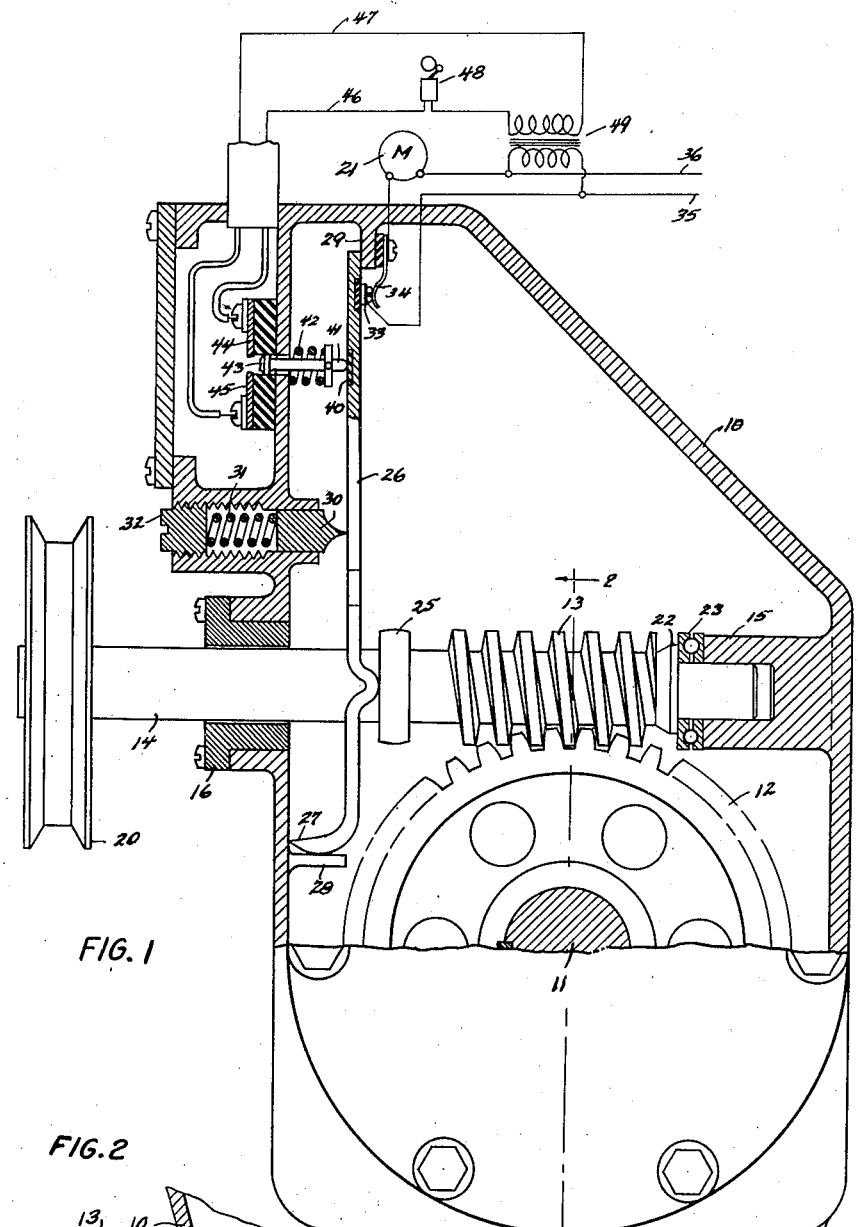

2,493,591

UNITED STATES PATENT OFFICE 2,493,591

STOKER ALARM AND CONTROL

Alwin B. Newton, Oakwood, Ohio, assignor to Chrysler Corporation, Highland Park, Mich., a corporation of Delaware Application May 27, 1946, Serial No. 672,496

2 Claims. (Cl. 198—232)

My present invention relates to a mechanism for operating a feed screw for a coal stoker or similar device.

In a coal stoker of the rotating screw type it quite often happens that some foreign substance such as bolts or other pieces of metal, rocks or pieces of wood are accidentally included in the coal supply and the feeding mechanism becomes jammed thereby. In such case means must be provided to protect the motor from being burned or other parts from becoming broken, and an alarm device is desirable to call attention to the existing condition before the fire extinguishes itself. An object of my invention is to provide a rotating feed screw stoker or the like with means for stopping the application of driving torque when the screw becomes jammed, in combination with means to sound an alarm mechanism as long as the screw remains jammed.

A further object of my invention is to provide means having the foregoing characteristics of such nature that the driving force will be automatically reapplied as soon as the obstruction is removed. The latter feature is of particular advantage since an obstruction quite often clears itself as soon as the driving torque is relieved; hence the present invention is particularly useful in that if the obstruction should clear itself normal operation will be resumed, thus providing further chance that the stoker will function in normal manner regardless of the presence or absence of an attendant.

The foregoing and other objects and advantages of my present invention will be apparent from the following specification taken in connection with the accompanying drawings.

In Fig. 1 a stoker feed driving mechanism made in accordance with my invention is shown partly in elevation and partly in section, and certain parts of the construction are schematically illustrated; and Fig. 2 is a section on the line 2—2 of Fig. 1.

The invention is illustrated as comprising a casing 10 within which is journalled a shaft 11 which may comprise a screw feeding device attached thereto through suitable connecting means (not shown). The shaft 11 is driven by a driven worm wheel 12 which is rotated by a driving worm gear 13. The gear 13 is fixed to a floating shaft 14 journalled in a box 15 and a removable bearing 16 carried by an opposing portion of the casing 10. The shaft 14 is rotated by a pulley 20 adapted to be driven through means of a belt (not shown) by a motor 21. Other forms of connecting mechanism may cause the motor 21 to rotate the shaft 14. When the shaft 14 is rotating and driving torque is being transmitted from the threads of gear 13 to the teeth of wheel 12 the floating shaft 14 will be forced toward the right so that a collar 22 thereon will engage a thrust bearing 23 retained against the end of the boss 15. If on the other hand the shaft 11 should be prevented from rotation while the gear 13 continues to rotate, the gear will feed itself back toward the left, such movement being permitted by longitudinal movement of the shaft 14. I have thus provided means for limiting the movement of the shaft in one longitudinal direction when the screw is being rotated and means whereby the shaft may move in the opposite direction if the screw should be prevented from rotating and thus causes the worm gear to back away from normal position.

In order to stop the motor 21 shortly after the screw is prevented from rotating I provide a motor switching device as follows: A collar 25 on shaft 14 engages a portion of a forked lever 26, the legs of which straddle the shaft. The lever 26 is provided with a lower fulcrum tip 27 bearing against a portion of the wall of the casing 10 and supported in position by a lug 28 extending from the wall. The upper end of the lever engages a lug 29 extending from the top of the casing and the lever is retained in such position by a movable fulcrum member 30 journalled in a boss of the wall of the casing. The member 30 is forced toward the right by a spring 31 adjustably compressed thereagainst by a plug 32. A contact 33 carried by the upper end of the lever engages a spring contact 34 carried by the lug 29 when the lever is in position as shown and the screw is being rotated. The contacts 33 and 34 complete a circuit to the driving motor 21 from power lines 35 and 36. As long as power is being supplied to the motor under control of suitable thermostatic or other controls (not shown) and contacts 33 and 34 remain in engagement, the shaft 11 will be rotated to cause feeding of coal to the fire. If the worm gear 13 should be backed away from normal position sufficiently to separate contacts 33 and 34 the motor 21 will stop. If the release of pressure against the obstruction when the motor stops causes the obstructing matter to drop from obstructing position the spring 31 is designed to have sufficient strength to shift the lever 26 back to reengage the contacts 33 and 34 and cause resumption of movement. Such shifting may be allowed within the normal play between the teeth of worm gear 13 and worm wheel 12, but I prefer providing a construction having sufficient leverage that the worm gear 13 may be rotated sufficiently to cause reengagement of the contacts. For this reason I prefer the flexibility of a driving belt to engage pulley 20 but other forms of mechanism readily apparent to skilled artisans will permit such freedom of reengagement movement.

It is to be noted that contacts 33 and 34 are suitably insulated from conductive portions of the casing. The lever 26 also carries a pad of insulation 40 adapted to engage the inner end of a rod 41 pressed against the pad by a spring 42. The outer end of the rod 41 forms a switch bridge 43 adapted to complete a circuit from a contact plate 44 to a spaced contact plate 45 carried on insulating blocks attached to the wall of the casing 10. Plate 44 is attached to a wire 46 and plate 45 to a wire 47 completing a circuit to an alarm bell 48 drawing power from a suitable portion of the circuit such as represented by transformer 49. When lever 26 is shifted by disengaging movement of the worm gear 13 the bridge 43 completes the circuit to the alarm bell to thus notify an attendant that attention should be given to the stoker. If the stoker clears itself the alarm bell will cease sounding. Other forms of circuit completing devices may be substituted for that illustrated, and the alarm bell may derive power from other suitable sources without departing from the spirit of my invention.

In the operation of my invention the shaft 11 will be rotatively driven to cause the feed screw or the like to supply coal to a retort in accordance with any of the usual manners. If the feed screw or the like should become blocked the floating shaft will back away from its normal position, thus causing the driving motor to be disconnected from the source of power and simultaneously causing an alarm to be sounded. If the obstruction should clear itself the worm gear will be automatically moved back to normal driving position, the motor will resume driving action and the alarm bell will cease sounding.

Having illustrated and described a preferred embodiment of my invention it should be apparent to those skilled in the art that modification in detail and arrangement thereof are permissible without departing from the spirit of my invention. I claim all such modifications as come within the scope of the following claims:

1. In a coal stoker of the type having a rotating screw for feeding the coal, a driven worm wheel for transmitting torque to said screw, a driving worm gear for transmitting torque to said worm wheel and having a normal operative position in engagement with said worm gear, a floating shaft carrying said driving worm gear, journal means supporting said shaft for rotative movement and permitting longitudinal movement thereof, a motor for driving said shaft, means limiting the movement of said shaft in one longitudinal direction when said screw is being rotated, yieldable means urging said shaft toward said limiting means, and switch means operated upon movement of said yieldable means to stop said motor if the screw should be prevented from rotating and said worm gear backs away from said normal position, said yieldable means being operable to close said switch means if the obstruction preventing rotation of the screw should be removed.

2. In a coal stoker of the type having a rotating screw for feeding the coal, a driven worm wheel for transmitting torque to said screw, a driving worm gear for transmitting torque to said worm wheel and having a normal operative position in engagement with said worm gear, a floating shaft carrying said driving worm gear, journal means supporting said shaft for rotative movement and permitting longitudinal movement thereof, a motor for driving said shaft, means limiting the movement of said shaft in one longitudinal direction when said screw is being rotated, yieldable means urging said shaft toward said limiting means, and switch means operated upon movement of said yieldable means to stop said motor if the screw should be prevented from rotating and said worm gear backs away from said normal position, said yieldable means comprising a pivotally mounted lever, spring means thrusting against said lever at a point remote from the fulcrum defined by the pivotal mounting of said lever and means associated with said shaft and engaged by said lever at a point between said fulcrum and said spring means whereby a mechanical advantage is provided to facilitate the return of said shaft to its normal position by said spring as an incident to removal of said obstruction.

ALWIN B. NEWTON.

REFERENCES CITED

The following references are of record in the file of this patent:

UNITED STATES PATENTS

| Number | Name | Date |
|---|---|---|
| 1,929,994 | Schlotman | Oct. 10, 1933 |
| 2,288,849 | Schwitzer | July 7, 1942 |
| 2,317,490 | Simpson | Apr. 27, 1943 |